US008683428B2

(12) United States Patent
Sliwowicz (10) Patent No.: US 8,683,428 B2
(45) Date of Patent: Mar. 25, 2014

(54) AUTOMATED GENERATION OF CLIENT/DRIVER COMMUNICATION INTERFACES

(75) Inventor: Paul Sliwowicz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 13/070,269

(22) Filed: Mar. 23, 2011

(65) Prior Publication Data
US 2012/0246614 A1 Sep. 27, 2012

(51) Int. Cl.
G06F 9/44 (2006.01)
G06F 9/45 (2006.01)

(52) U.S. Cl.
USPC ........... 717/107; 717/106; 717/110; 717/136; 717/137; 717/140

(58) Field of Classification Search
None
See application file for complete search history.

(56) References Cited

U.S. PATENT DOCUMENTS

| | | | | |
|---|---|---|---|---|
| 5,802,365 A * | 9/1998 | Kathail et al. | ........... | 719/321 |
| 6,148,346 A | 11/2000 | Hanson | | |
| 6,671,743 B1 * | 12/2003 | Verity | ................. | 719/321 |
| 7,444,644 B1 * | 10/2008 | Slaughter et al. | ........... | 719/315 |
| 7,493,630 B2 * | 2/2009 | Hunt | ................. | 719/330 |
| 7,523,023 B1 * | 4/2009 | Koh et al. | ................ | 703/2 |
| 7,526,762 B1 * | 4/2009 | Astala et al. | ............ | 717/171 |
| 7,574,713 B2 * | 8/2009 | Tabares et al. | ........... | 719/321 |
| 7,584,473 B2 * | 9/2009 | Forin et al. | ............ | 718/100 |
| 7,810,103 B2 | 10/2010 | Shier et al. | | |
| 7,904,878 B2 * | 3/2011 | Kolathur et al. | ............ | 717/106 |
| 8,069,436 B2 * | 11/2011 | Snyder et al. | ............ | 717/106 |
| 2003/0140332 A1 * | 7/2003 | Norton et al. | ............ | 717/106 |
| 2003/0181196 A1 * | 9/2003 | Davidov et al. | ............ | 455/414.1 |
| 2004/0010795 A1 * | 1/2004 | Sasaki et al. | ............ | 719/321 |
| 2005/0086632 A1 | 4/2005 | Oyama | ................. | 717/100 |
| 2006/0107222 A1 * | 5/2006 | Gallagher | ............ | 715/762 |
| 2007/0073753 A1 * | 3/2007 | Baikov | ................. | 707/101 |
| 2009/0064126 A1 * | 3/2009 | Elord et al. | ............ | 717/170 |
| 2009/0064196 A1 * | 3/2009 | Richardson et al. | ......... | 719/327 |
| 2009/0254881 A1 * | 10/2009 | Johnson et al. | ........... | 717/117 |
| 2012/0089971 A1 * | 4/2012 | Williams et al. | ............ | 717/167 |
| 2012/0137282 A1 * | 5/2012 | Illowsky et al. | ............ | 717/177 |
| 2012/0246614 A1 * | 9/2012 | Sliwowicz | ............ | 717/107 |

OTHER PUBLICATIONS

Author: Choi et al., Title: "Code Generation for Linux Device Driver", Published by IEEE. Published in: Advanced Communication Technology, 2006. ICACT 2006. The 8th International Conference (vol. 1 ), Date of Conference: Feb. 20-22, 2006.*
Bovenzi, et al., "Enabling Legacy System Accessibility by Web Heterogeneous Clients", Retrieved at<<http://ieeexplore.ieee.org/stamp/stamp.jsp?tp=&arnumber=1192412>>, 2003, pp. 9.

* cited by examiner

Primary Examiner — Don Wong
Assistant Examiner — Hossain Morshed
(74) Attorney, Agent, or Firm — Andrew Sanders; Micky Minhas; Wolfe-SBMC

(57) ABSTRACT

Various embodiments provide a mechanism by which a driver writer can describe the operation set of a particular driver using an intermediary representation, such as an XML. A generation tool can then process the intermediary representation and generate client code and device driver code to support these operations. In one or more embodiments, driver operation and associated elements that support the driver operation can be described according to a customized schema that is specific to the operation of the particular device driver.

20 Claims, 6 Drawing Sheets

AUTOMATED GENERATION OF CLIENT/DRIVER COMMUNICATION INTERFACES

BACKGROUND

A device input and output control (IOCTL) interface is a mechanism through which an application can communicate with a device driver. The IOCTL interface can be used by applications to send control codes to a variety of devices. Each control code represents an operation for the driver to perform. For example, a control code can ask a device driver to return information about the corresponding device, or direct the driver to carry out an action on the device, such as formatting a disk and the like.

There are typically standard control codes and device-specific control codes. The types of control codes that can be specified depend on the device being accessed and the platform on which the application is running. Applications can use standard control codes or device-specific control codes to perform direct input and output operations on a particular device, such as a floppy disk drive, hard disk drive, tape drive, or CD-ROM drive.

Today, challenges exist with respect to validating packets that are sent via IOCTL interfaces because, often times, the packets are not described in a format other than one that is known to the vendor of the packet. Additionally, challenges exist because there are no standard ways for a driver to specify, to entities other than certain driver clients, operational parameters associated with its set of operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a mechanism by which a driver writer can describe the operation set of a particular driver using an intermediary representation, such as an XML. A generation tool can then process the intermediary representation and generate client code and device driver code to support these operations.

In one or more embodiments, driver operation and associated elements that support the driver operation can be described according to a customized schema that is specific to the operation of the particular device driver. The description, as represented by the customized schema, can be converted into a distinct set of code files that support communication from the client to the driver for a particular set of operations.

In one or more embodiments, distinct security requirements associated with individual operations of a driver's set of operations can be specified and applied, as opposed to having blanket security across all operations, thus alleviating the need to manually perform intricate bit manipulations in the driver.

BRIEF DESCRIPTION OF THE DRAWINGS

The same numbers are used throughout the drawings to reference like features.

DETAILED DESCRIPTION

Overview

Various embodiments provide a mechanism by which a driver writer can describe the operation set of a particular driver using an intermediary representation, such as an XML. A generation tool can then process the intermediary representation and generate client code and device driver code to support these operations.

In one or more embodiments, driver operation and associated elements that support the driver operation can be described according to a customized schema that is specific to the operation of the particular device driver. The description, as represented by the customized schema, can be converted into a distinct set of code files that support communication from the client to the driver for a particular set of operations.

In one or more embodiments, distinct security requirements associated with individual operations of a driver's set of operations can be specified and applied, as opposed to having blanket security across all operations, thus alleviating the need to manually perform intricate bit manipulations in the driver.

In the discussion that follows, a section entitled "Operating Environment" is provided and describes one environment in which one or more embodiments can be employed. Following this, a section entitled "Example Schema" describes an example schema in accordance with one or more embodiments. Next, a section entitled "Example Code Generation Tool" describes a code generation tool that automatically generates client-side and device driver-side code in accordance with one or more embodiments. Last, a section entitled "Example Methods" describes example methods in accordance with one or more embodiments.

Consider now an example operating environment in which one or more embodiments can be implemented.

Operating Environment

Figure 1:
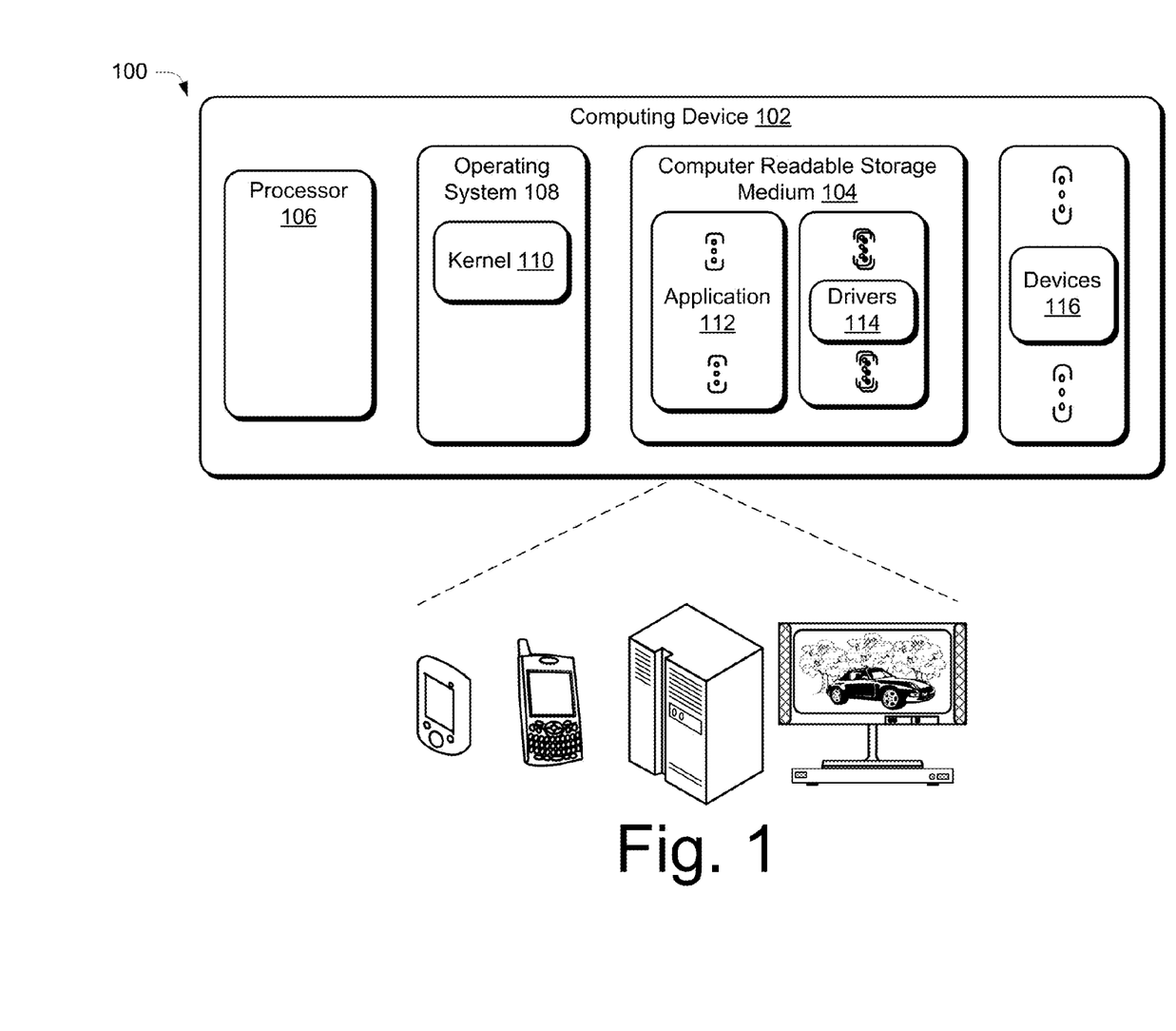
FIG. 1 illustrates an operating environment in which various principles described herein can be employed in accordance with one or more embodiments.

FIG. 1 is an illustration of an environment 100 in an example implementation that is operable to employ techniques described herein. The illustrated environment 100 includes a computing device 102, which may be configured in a variety of ways. In this example, computing device 102 represents a client computing device that can utilize or take advantage of client-side (i.e. application code) and device-driver code that is generated as described below.

For example, the computing device 102 may be configured as a portable game device, mobile phone, a computer that is capable of communicating over a network (e.g., a desktop computer, laptop, one or more servers, an entertainment appliance), a set-top box communicatively coupled to a display device, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. Alternately or additionally, the computer-readable medium may also be configured as a computer-readable storage medium 104, as illustrated here, and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

The computing device 102 is also illustrated as including one or more processors 106. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single processor 106 is shown, a wide variety of types and combinations of processors and/or computer-readable media may be employed.

The computing device 102 also includes an operating system 108 having a kernel 110. Computer readable storage medium 104 includes one or more entities such as application 112 and one or more drivers 114 that are configured to support communication between the kernel 110 of the operating system 108, application 112 and one or more devices 116, as described above and below.

The kernel 110 represents a component of the operating system 108 that is typically employed to abstract functionality of underlying devices such as the processor 108 and other devices 116 to applications and other software that are executed by the computing device 102.

The devices 116 may be representative of a variety of different devices that may be employed by the computing device 102. For example, the devices 116 may include peripheral devices, such as printers, scanners, hard drives, and so on. Additionally, devices 116 can include such things as memory or storage devices internal to the computing device. The devices 116 may also represent functionality of other computing devices that may be leveraged by the computing device 102, such as to use a mobile phone as a storage device, access photos on the mobile phone, and so on. Thus, the computing device 102 may leverage a variety of different devices 116 to add to the functionality of the computing device 102.

In order for the devices 116 to communicate with the computing device 102, and more particularly the operating system 108 and kernel 110 of the computing device, one or more drivers 114 may be employed. Drivers can include both user mode drivers and kernel mode drivers. Drivers 114 are typically employed to abstract functionality of a corresponding device 116.

For example, the driver 114 may be configured as a series of layers to translate commands from the kernel 110 of the operating system 108 into device specific commands that are "understandable" by a respective device.

In the embodiments described below, a mechanism is provided by which a driver writer (i.e. author) can describe the operation set of a particular driver using an intermediary representation, such as an XML. A generation tool can then process the intermediary representation and generate client code and device driver code to support these operations. Code generation can be an automatic operation in which client-side and device driver-side code is generated.

In one or more embodiments, driver operation and associated elements that support the driver operation can be described according to a customized schema that is specific to the operation of the particular device driver. The description, as represented by the customized schema, can be converted into a distinct set of code files that support communication from the client to the driver for a particular set of operations.

In one or more embodiments, distinct security requirements associated with individual operations of a driver's set of operations can be specified and applied, as opposed to having blanket security across all operations, thus alleviating the need to manually perform intricate bit manipulations in the driver.

Generally, any of the functions described herein can be implemented using software, firmware, hardware (e.g., fixed logic circuitry), manual processing, or a combination of these implementations. The terms "module," and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Having described an example operating environment, consider now a discussion of an example schema that can be utilized to enable driver writers (i.e., authors) to describe operation sets in a manner which can facilitate automatic client-side and device driver-side code generation.

Example Schema

Shown just below is a schema that has been annotated (via "<xsd:annotation>" tags to explain various aspects of the schema. Although the schema is illustrated as XML, it is to be appreciated that any suitable format can be used to enable driver writers to express an intermediate representation of their particular driver's set of operations so that client-side and device driver-side code can be generated as described below. An explanation of the schema appears just below its presentation.

---

```
<xsd:schema xmlns:xsd="http://www.w3.org/2001/XMLSchema"
  targetNamespace="DeviceInterfaceGeneration"
  xmlns:tns="DeviceInterfaceGeneration" elementFormDefault="qualified">
  <xsd:element name="DIGTemplate" type="tns:DIGTemplate"/>
```

```xml
<xsd:complexType name="DIGTemplate">
    <xsd:annotation>
        <xsd:documentation>
            The root element for a DIG XML file. Includes at least one
            interface.
        </xsd:documentation>
    </xsd:annotation>
    <xsd:sequence minOccurs="1" maxOccurs="unbounded">
        <xsd:element name="Interface" type="tns:Interface"/>
    </xsd:sequence>
</xsd:complexType>
<xsd:complexType name="Interface">
    <xsd:annotation>
        <xsd:documentation>
            Specifies a single DIG interface.
            An interface contains a set of operations, and can include
            security rights and include files as well.
        </xsd:documentation>
    </xsd:annotation>
    <xsd:sequence>
        <xsd:element name="Operations"
type="tns:Operations" minOccurs="1"/>
        <xsd:element name="SecurityRights" type="tns:SecurityRights"
minOccurs="0" maxOccurs="1"/>
        <xsd:element name="IncludeFiles" type="tns:IncludeFiles"
minOccurs="0" maxOccurs="1"/>
    </xsd:sequence>
    <xsd:attribute name="name" type="xsd:string" use="required"/>
    <xsd:attribute name="interfaceGuid" type="tns:autogenuuid"
use="required"/>
</xsd:complexType>
<xsd:complexType name="Operations">
    <xsd:sequence minOccurs ="1" maxOccurs="16">
        <xsd:element name="Operation" type="tns:Operation"/>
    </xsd:sequence>
</xsd:complexType>
<xsd:complexType name="Operation">
    <xsd:annotation>
        <xsd:documentation>
            Specifies a single operation supported by this interface.
            Operations are defined as a set of parameters and a
            list of attributes applying to the operation.
        </xsd:documentation>
    </xsd:annotation>
    <xsd:sequence>
        <xsd:element name="Parameters" type="tns:Parameters"/>
        <xsd:element name="RequiredRights"
type="tns:RequiredRights"/>
    </xsd:sequence>
    <xsd:attribute name="name" type="xsd:string" use="required"/>
    <xsd:attribute name="return" type="xsd:string" use="required"/>
    <xsd:attribute name="async" type="xsd:boolean" use="optional"/>
    <xsd:attribute name="legacy" type="xsd:boolean" use="optional"/>
</xsd:complexType>
<xsd:complexType name="Parameters">
    <xsd:sequence minOccurs ="0" maxOccurs="16">
        <xsd:element name="Parameter" type="tns:Parameter"/>
    </xsd:sequence>
</xsd:complexType>
<xsd:complexType name="Parameter">
    <xsd:annotation>
        <xsd:documentation>
            Specifies a parameter.
            Required attributes:
            name - Name of the parameter.
            type - Type of the parameter.
            form - Directionality of the parameter (eg. in, out, inout)
            Optional attributes:
            optional - Indicates whether this parameter is optional or not.
            requiresSizeParam - Indicates another parameter should be
            created that specifies the size of this parameter.
        </xsd:documentation>
    </xsd:annotation>
    <xsd:attribute name="name" type="xsd:string"/>
    <xsd:attribute name="type" type="xsd:string" use="required"/>
    <xsd:attribute name="form" type="tns:ParameterForm"
use="required"/>
    <xsd:attribute name="requiresSizeParam" type="xsd:boolean"
use="optional"/>
    <xsd:attribute name="optional" type="xsd:boolean" use="optional"/>
</xsd:complexType>
<xsd:simpleType name="ParameterForm">
    <xsd:restriction base="xsd:string">
        <xsd:enumeration value="in"/>
        <xsd:enumeration value="out"/>
        <xsd:enumeration value="inout"/>
    </xsd:restriction>
</xsd:simpleType>
<xsd:complexType name="SecurityRights">
    <xsd:sequence minOccurs="1" maxOccurs="15">
        <xsd:element name="SecurityRight" type="tns:SecurityRight"/>
    </xsd:sequence>
</xsd:complexType>
<xsd:complexType name="SecurityRight">
    <xsd:annotation>
        <xsd:documentation>
            Specifies a security right. This is a right that can be assigned
            to an operation in an interface. The list of security IDs dictates
            which entities are granted this right.
        </xsd:documentation>
    </xsd:annotation>
    <xsd:sequence minOccurs="1" maxOccurs="unbounded">
        <xsd:element name="SecurityID" type="tns:SecurityID"/>
    </xsd:sequence>
    <xsd:attribute name="name" type="xsd:string"/>
</xsd:complexType>
<xsd:simpleType name="SecurityID">
    <xsd:restriction base="xsd:string">
        <xsd:enumeration value="World"/>
        <xsd:enumeration value="System"/>
        <xsd:enumeration value="Admin"/>
        <xsd:enumeration value="LocalService"/>
        <xsd:enumeration value="NetworkService"/>
        <xsd:enumeration value="Restricted"/>
        <xsd:enumeration value="Interactive"/>
        <xsd:enumeration value="LowIntegrity"/>
        <xsd:enumeration value="MediumIntegrity"/>
    </xsd:restriction>
</xsd:simpleType>
<xsd:complexType name="RequiredRights">
    <xsd:sequence minOccurs ="0" maxOccurs="15">
        <xsd:element name="RequiredRight" type="tns:RequiredRight"/>
    </xsd:sequence>
</xsd:complexType>
<xsd:complexType name="RequiredRight">
    <xsd:annotation>
        <xsd:documentation>
            Specifies a required right. This is the name of a security right
            specified elsewhere in the document that applies to a specific
            operation.
        </xsd:documentation>
    </xsd:annotation>
    <xsd:attribute name="name" type="xsd:string"/>
</xsd:complexType>
<xsd:complexType name="IncludeFiles">
    <xsd:sequence minOccurs="1" maxOccurs="unbounded">
        <xsd:element name="IncludeFile" type="tns:IncludeFile"/>
    </xsd:sequence>
</xsd:complexType>
<xsd:complexType name="IncludeFile">
    <xsd:annotation>
        <xsd:documentation>
            Specifies an include file that should be added to the generated
            code that contains structures that are outside the standard
            headers.
        </xsd:documentation>
    </xsd:annotation>
    <xsd:attribute name="name" type="xsd:string" use="required"/>
    <xsd:attribute name="path" type="xsd:string" use="optional"/>
</xsd:complexType>
<xsd:simpleType name="uuid">
    <xsd:annotation>
        <xsd:documentation>
            Values of the type will look like: "01234567-89AB-CDEF-0123-456789ABCDEF" or "{01234567-89AB-CDEF-0123-456789ABCDEF}".
        </xsd:documentation>
    </xsd:annotation>
    <xsd:restriction base="xsd:string">
        <xsd:pattern value="[{(]?[0-9A-Fa-f]{8}\-?[0-9A-Fa-f]{4}\-?[0-9A-Fa-f]{4}\-?[0-9A-Fa-f]{4}\-?[0-9A-Fa-f]{12}[})]?"/>
```

```
                </xsd:restriction>
            </xsd:simpleType>
            <xsd:simpleType name="autogenuuid">
                <xsd:annotation>
                    <xsd:documentation>
                        Values of this type will look like: "01234567-89AB-CDEF-
0123-456789ABCDEF" or "{01234567-89AB-CDEF-0123-
456789ABCDEF}". A GUID can be auto-generated by writing all
question marks like this: "????????-????-????-????-????????????".
Also allows "PUT-GUID-HERE" for use in examples.
                    </xsd:documentation>
                </xsd:annotation>
                <xsd:restriction base="xsd:string">
                    <xsd:pattern value="[{(]?[0-9A-Fa-f]{8}\-?[0-9A-Fa-f]{4}\-?[0-9A-Fa-f]{4}\-?[0-9A-Fa-f]{4}\-?[0-9A-Fa-f]{12}[})]?|[{(]?\?{8}\-\?{4}\-\?{4}\-\?{4}\-\?{12}[})]?|PUT\-GUID\-HERE"/>
                </xsd:restriction>
            </xsd:simpleType>
</xsd:schema>
```

The above-illustrated schema provides a way for driver writers to encapsulate, in a declarative fashion, a set of driver operations. This gives the device vendor the ability to declare and describe the operations of the driver, without necessarily having to define the specific driver structures themselves. Driver writers can simply specify or describe the inputs, the output buffers and various other parameters that their driver utilizes, and the resultant intermediate representation can be processed, as described below by a generation tool, to automatically generate client-side and device driver-side code that facilitates communication between client-side entities, such as, by way of example and not limitation, applications, drivers and their corresponding devices.

Starting at or near the top of the schema, in the illustrated and described embodiment, the "DIGTemplate" element is the root element for the XML file that is to be defined utilizing this schema.

The Interface element specifies a single interface. An interface is a set of operations that a driver implements. The set of operations can include security rights and includes files as specified by schema elements discussed below. By authoring an XML file that describes the set of operations, the driver writer or author provides the generation tool with the information and data that that can be utilized to generate the code that exposes these operations, as well as code to handle the shuttling of the data and information from and between the client and driver.

The Operation element is associated with one function or one method. An operation is defined as a set of parameters and a list of attributes, e.g., an operation can receive a list of parameters and has a return value. Under the Operation element, there are a list of attributes. The attributes described here include, by way of example and not limitation, name, return, async, and legacy. The attributes tell the generation tool how to generate the code for this particular operation.

The parameters constitute a list of parameters that a particular operation receives. For example, if one looks at a function signature, there is a function name, and a list of parameters—some of which may be required, others of which may be optional. The parameters in this example include a type and a form. The form is something that is passed in by the client (e.g. "in"), something that the driver returns (e.g. "out"), or is bidirectional (e.g. "inout").

The SecurityRight element allows for specification of a security right that can be assigned to individual operations, on an operation-by-operation basis. Additionally, this element includes a list of security IDs that indicate which entities are granted access to a particular operation. In some embodiments, the security rights, as specified, can be added to an access control list (ACL) for each operation. In one or more embodiments, a single ACL can be utilized and associated with the kernel representation of the device (e.g. the device object) that gates access to the device. The generation tool then generates the code that is included in the driver that ensures that the security rights are enforced via the access control list.

The RequiredRight element essentially maps a specific right to a particular operation.

The IncludeFile element enables the driver writer to specify a file that contains or describes structures associated with the parameters and which should be added to the generated code.

The remainder of the illustrated schema essentially describes the correct format of a unique ID that is associated with the interface that is created by the driver writer.

Having described an example schema in accordance with one or more embodiments, consider now a discussion of a generation tool and its role in the process of generating client-side and device driver-side code using an intermediate representation authored in accordance with the above-described schema.

Example Code Generation Tool

Figure 2:
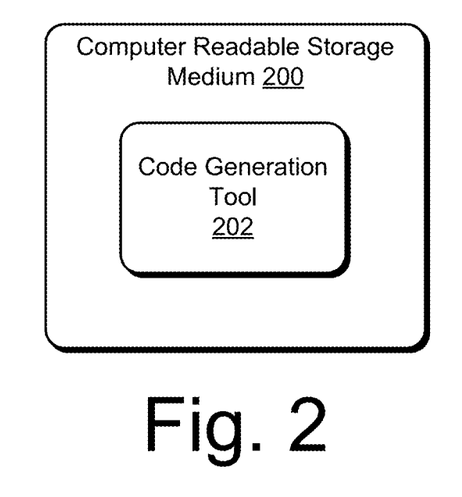
FIG. 2 illustrates a computer readable storage medium that includes computer readable instructions in the form of a code generation tool in accordance with one or more embodiments.

FIG. 2 illustrates a computer readable storage medium 200 that includes computer readable instructions in the form of a code generation tool 202. The description or intermediate representation authored by the driver writer is processed by the code generation tool and, in at least some embodiments, other software components, to provide and both client-side code and device driver-side code to expose a driver's operation set in a manner which allows the client-side code to communicate with the device driver-side code, and vice versa, in an integrated manner.

Figure 3:
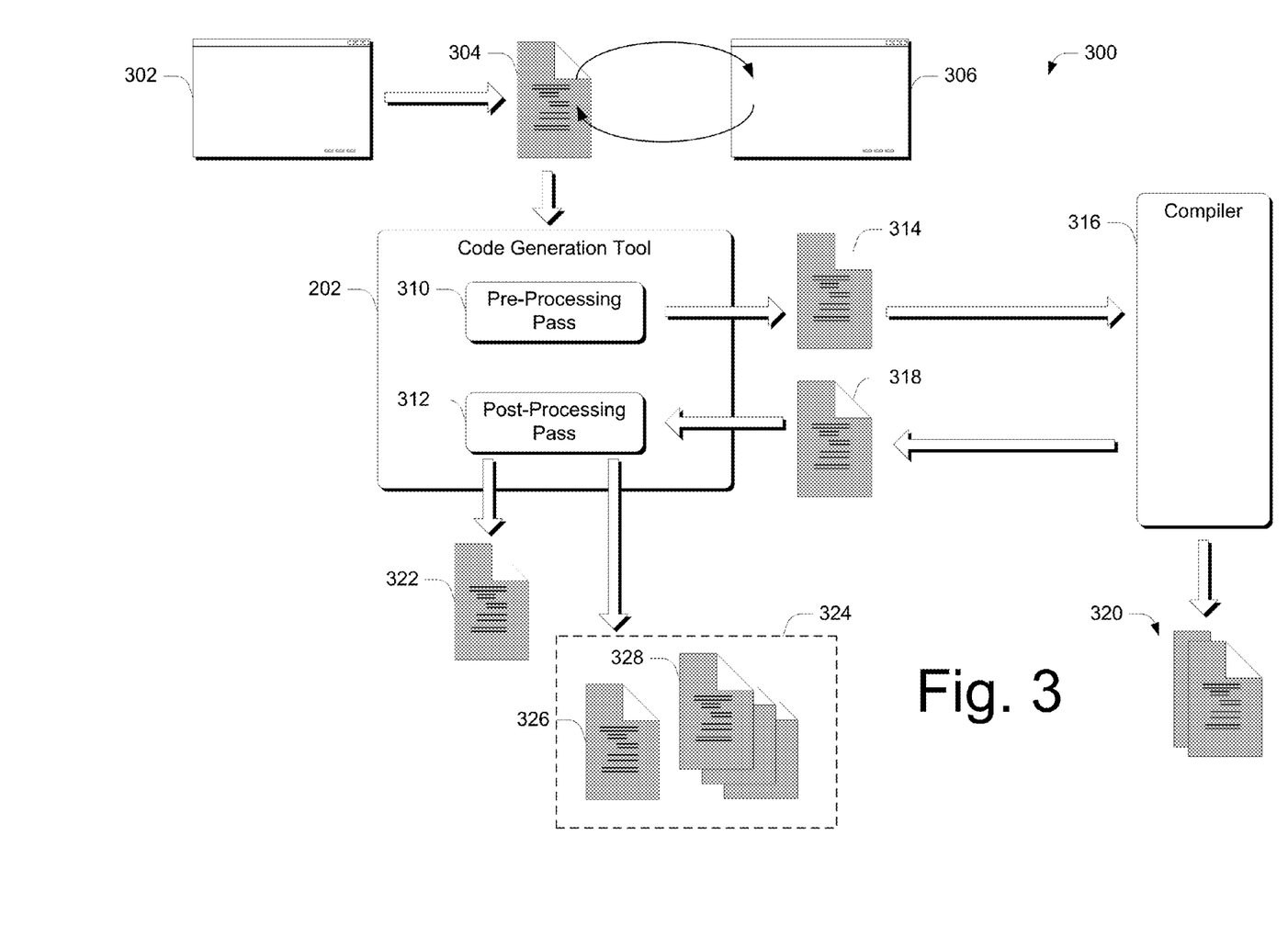
FIG. 3 illustrates an example code generation tool flow in accordance with one or more embodiments.

As but one example of a code generation tool 202 in an operating environment, consider FIG. 3 which illustrates an example code generation tool flow, in accordance with one or more embodiments, generally at 300.

In the illustrated and described embodiment, a user interface in the form of a wizard 302 can be presented to a user, such as a driver writer, when the user wishes to create a new driver project. The wizard can allow the user to create interfaces for the driver as described above and below.

If the user opts to create a new driver project, a device operation descriptor file 304 is created. The device operation descriptor file, when completed, represents an intermediate representation of the driver's set of operations. The device operation descriptor file can reside in any suitable format. Such format can include, by way of example and not limitation, an XML format that complies with a standardized schema, such as the schema described above. When working within a particular driver project, the user can employ an editor 306 to assist in building the device operation descriptor file. Any suitably-configured editor can be utilized, an example of which includes an XML editor. Editor 306 can enable a user to add, remove, and configure interfaces that will be exposed by a corresponding driver via a driver/client runtime.

In one or more embodiments, building and editing the interfaces can be performed utilizing a form provided by editor 306 which essentially provides a structured mechanism to configure the device operation descriptor file without having to directly modify the XML in the text editor. Changes made to the form can be reflected directly in the device operation descriptor file. By employing a form to edit the device operation descriptor file, the user is relieved of having to understand the semantics imposed by the standardized schema. The form thus encapsulates logic provided by the user and ensures that the resulting device operation descriptor file is semantically and syntactically correct.

After the device operation descriptor file 304 is formed, it can be passed to code generation tool 202 for processing. In one or more embodiments, code generation tool 202 includes a pre-processing pass module 310 and a post-processing pass module 312. When the code generation tool 202 receives the device operation descriptor file, it opens the file and can use a library, such as an XML library, to ensure that the file was correctly authored against the schema.

The tool is cognizant of the definitions provided by the schema and creates an in-memory representation of the interface by parsing through the XML. The in-memory representation of the interface is effectively a tree-like representation that includes a root which represents the interface itself, and branches off of the root that represent the set of driver operations as described in the schema.

During this processing, pre-processing pass module 310 builds a file 314 that describes the interface contracts defined by the XML. Interface contracts, in general, basically represent how to use the interface and can specify such things as preconditions, postconditions, return value, arguments, parameters and the like. Thus, interface contracts constitute a representation of what is to be implemented for the interface to be supported. Any suitable type of file can be utilized. In one or more embodiments, an interface definition language (IDL) file is built. As will be appreciated by the skilled artisan, an IDL file typically contains interface and type library definitions. Each interface consists of a header and a body. The interface header contains attributes that apply to the entire interface. The body of the interface contains the remaining interface definitions.

File 314 is passed to a compiler 316 which further processes file 314 to produce several files. Any suitable compiler can be utilized. In embodiments where file 314 comprises an IDL file, compiler 316 can reside in the form of MIDL compiler. As will be appreciated by the skilled artisan, the MIDL compiler processes the IDL file to generate a type library and various output files. The type of output files generated by the MIDL compiler depends on the attributes specified in the IDL file's interface attribute list.

In the illustrated and described embodiment, MIDL compiler 316 generates an export file 318. The export file contains the information that the compiler used to decide how to create stubs and headers for the operations described in the IDL file. In addition, in this particular example, MIDL compiler 316 produces client header and client marshalling stub files 320 that are utilized for leveraging remote procedure calls (RPC) which are utilized in marshalling requests and responses between client-side code and device driver-side code, as will be appreciated by the skilled artisan.

Export file 318 is processed by the post-processing pass module 312 to produce client-side code 322 and a device driver-side code 324. During this code generation pass, two generators are employed—one that generates client-side code and another that generates device driver-side code. To generate this code, post-processing pass module 312 utilizes the in-memory representation of the interface that was previously built, along with additional information included in the export file regarding the parameters and other attributes associated with the driver operations. This provides a flow of code so that from a simple method header that is provided to the client, when a particular client calls the simple method, all of the associated parameters that are supplied are packaged and marshalled appropriately to the device driver-side code. On the driver-side, the package is un-marshalled and sent to the driver for processing. When the driver returns, the information or data is repackaged and marshalled back to the client.

In the illustrated example, the client-side code comprises a set of C routines mapping to the operations supplied in the device operation descriptor file 304. The routines are responsible for marshalling the client data and sending the request to the driver. The device driver-side code 324 includes driver interface sources 326 and other files 328 such as header files (.h files), C/C++ source code files (.c files) and the like.

Having considered a code generation tool flow, consider now an example run time flow in accordance with one or more embodiments.

Figure 4:
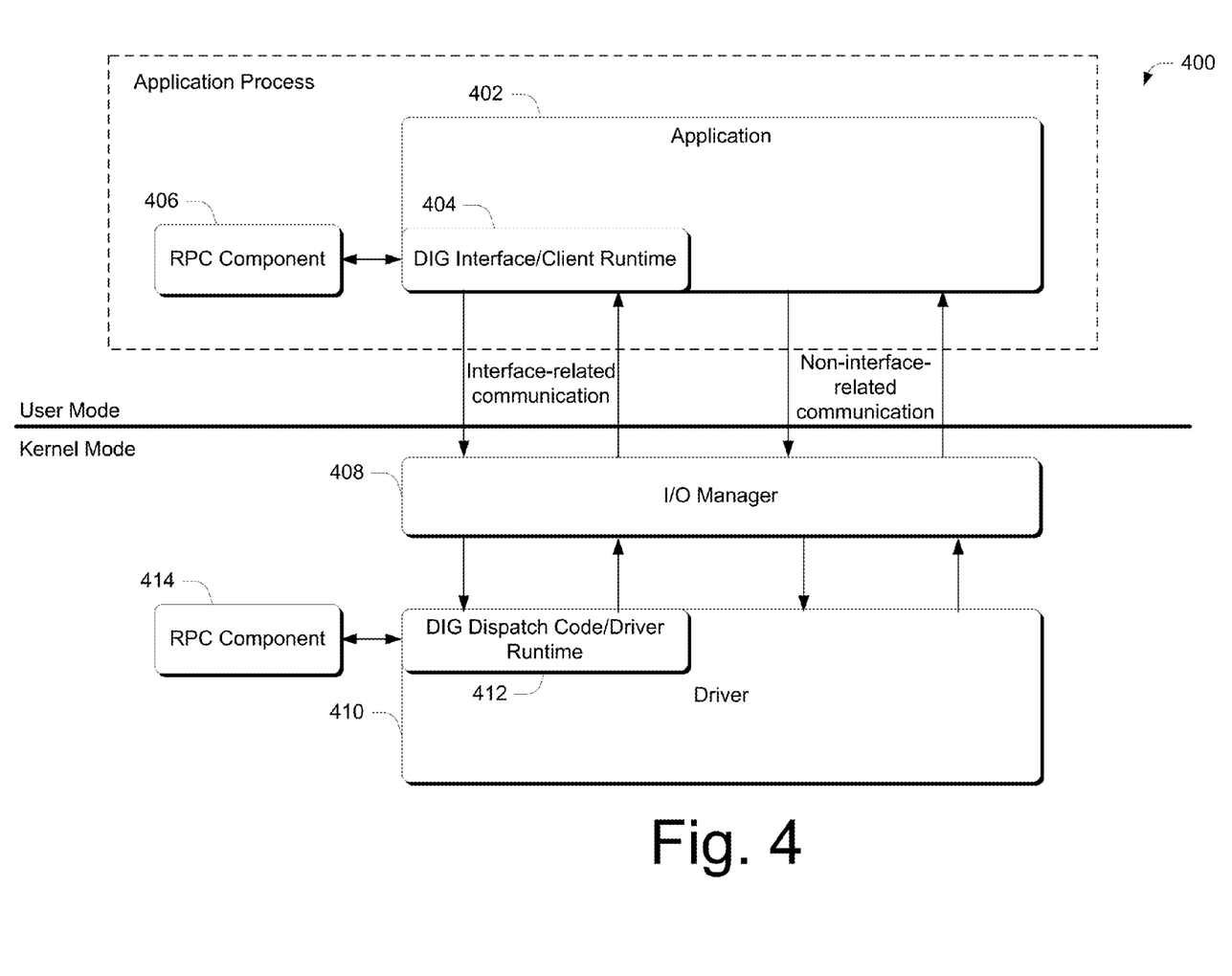
FIG. 4 illustrates an example runtime flow in accordance with one or more embodiments.

FIG. 4 illustrates an example run-time flow in accordance with one or more embodiments, generally at 400. In the illustrated and described embodiment, an application 402 runs in an application process designated by the dashed line. The application process resides in the user mode as indicated by the user mode/kernel mode boundary.

Application 402 includes, in this example, a Device Interface Generation (DIG) interface/client run time component 404. Component 404 corresponds to the client-side code that was generated as described above and enables communication between client-side and device driver-side entities. A remote procedure call (RPC) component 406 also resides within the application process and is responsible for marshalling and un-marshalling data sent from application 402 and data received back from driver 410, respectively. The RPC component 406 is associated with header and stub files 320 (FIG. 3) that were previously produced by compiler 316.

In the illustrated and described embodiment, the kernel mode includes an input/output (I/O) manager 408 that is responsible for handling requests from the application 402 and routing the requests to the correct driver. Driver 410 includes a DIG dispatch code/driver run time component 412. Component 412 corresponds to the device driver-side code that was generated as described above. RPC component 414 is communicatively associated with the driver 410 and is responsible for un-marshalling and marshalling data received from application 402 and data sent by driver 410, respectively. The RPC component 414 is associated with header and stub files 320 (FIG. 3) that were previously produced by compiler 316. In one or more embodiments, RPC component 414 can comprise either a user mode component or a kernel mode component.

In operation, when application 402 wishes to perform some type of operation on a device by, for example, communicating with its corresponding driver 410, the application calls one of the operations on DIG interface/client run time component 404. Component 404 utilizes RPC component 406 to marshall the corresponding data utilizing one or more of the remote procedure call routines. The marshalled data is then passed to the I/O manager 408 which passes the data to the DIG dispatch code/driver run time component 412. Component 412 utilizes RPC component 414 to un-marshall the data from the client, and then calls the driver 410 which then handles the operation, utilizing the parameters that were described in the device operation descriptor file.

When the driver 410 returns to the application 402, RPC component 414 is called to marshall the return data, which is then returned via component 412 to the application 402 by way of I/O manager 408. The returned data is un-marshalled by RPC component 406 and processed by application 402.

Having described an example tool flow and runtime flow in accordance with one or more embodiments, consider now some example methods in accordance with one or more embodiments.

Example Methods

Figure 5:
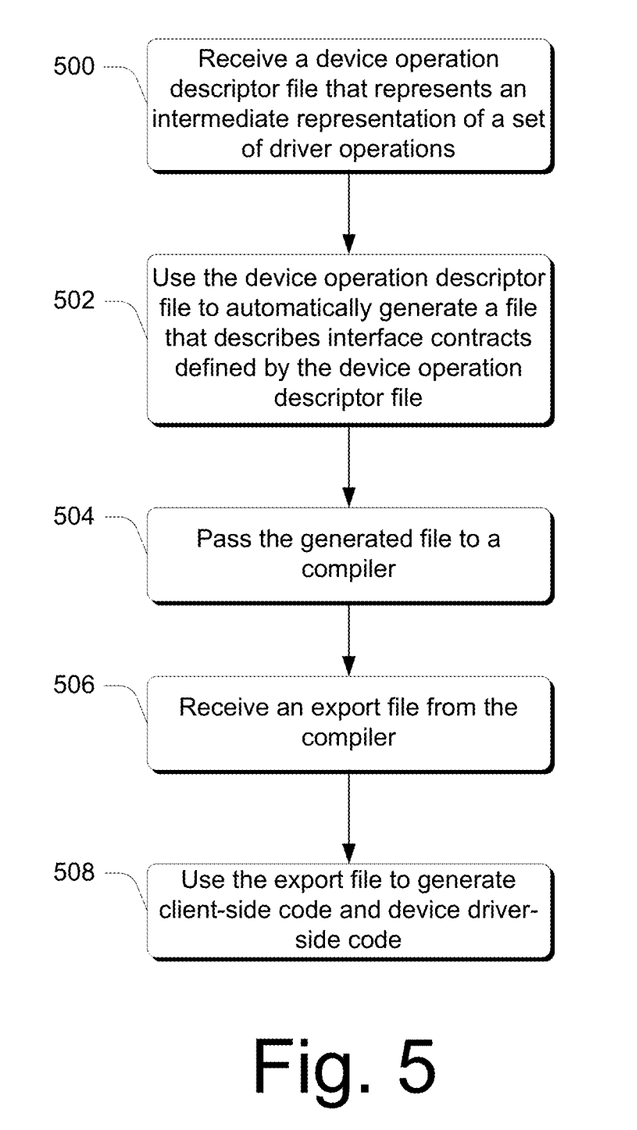
FIG. 5 illustrates steps in a method in accordance with one or more embodiments.

FIG. 5 is a flow diagram that describes steps in a code generation method in accordance with one or more embodiments. The method can be performed in connection with any suitable hardware, software, firmware, or combination thereof. In at least some embodiments, the method can be performed by a suitably-configured code generation tool, such as the one described above in FIG. 2.

Step 500 receives a device operation descriptor file that represents an intermediate representation of a set of driver operations. Any suitable type of descriptor file can be received. In at least some embodiments, the descriptor file comprises an XML file that has been created in accordance with a standardized schema. But one example of a standardized schema is provided above. Step 502 uses the device operation descriptor file to automatically generate a file that describes interface contracts defined by the device operation descriptor file. Any suitable type of file can be generated. In at least some embodiments, the generated file comprises an IDL file. Step 504 passes the generated file to a compiler. Any suitable type of compiler can be utilized. In at least some embodiments, the compiler comprises a MIDL compiler. Other types of compilers can, however, be utilized without departing from the spirit and scope of the claimed subject matter.

Step 506 receives an export file from the compiler. Examples of export files are provided above. Step 508 uses the export file to generate client-side code and device driver-side code. Examples of how this can be done are provided above.

Figure 6:
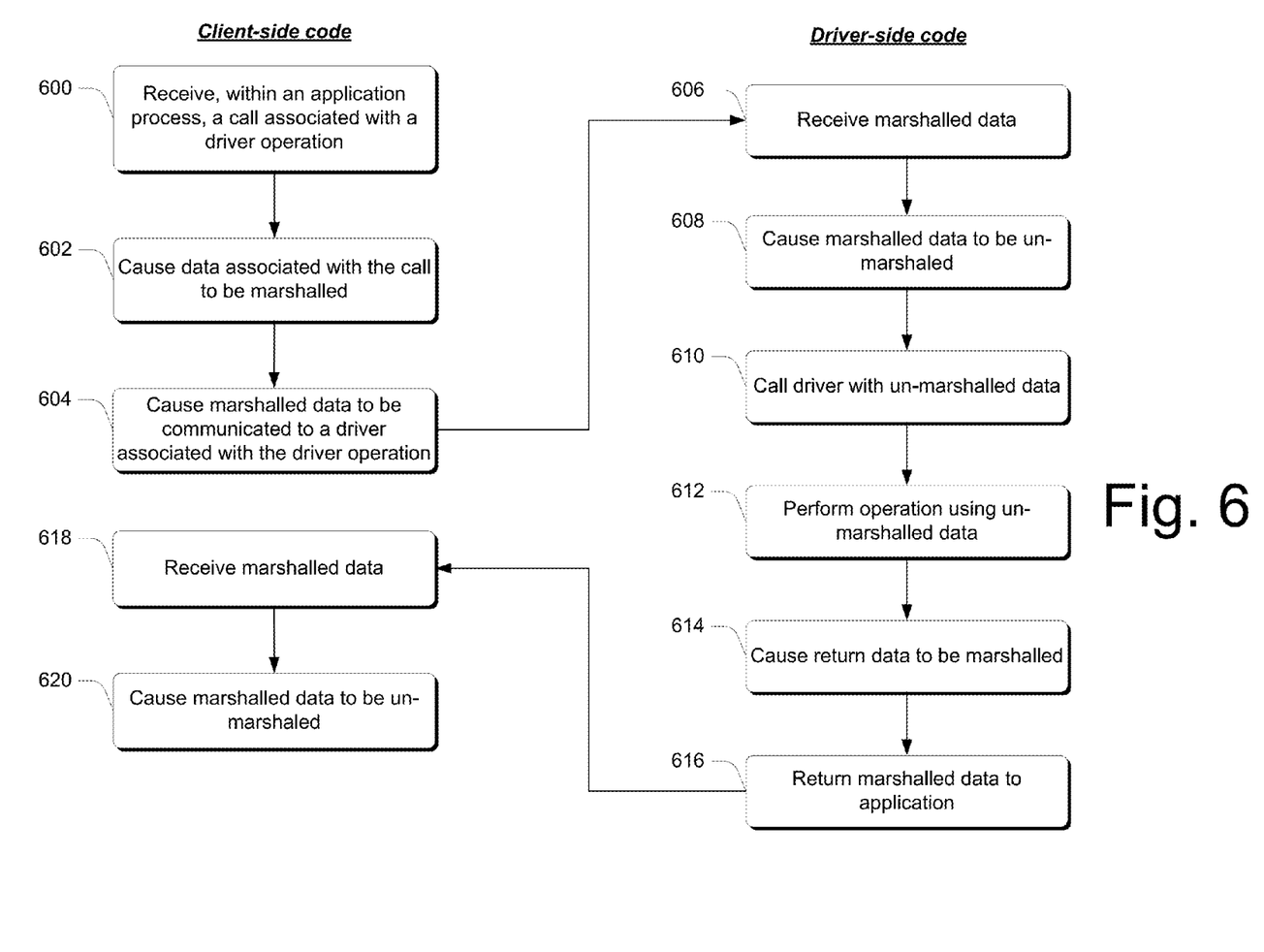
FIG. 6 illustrates steps in a method in accordance with one or more embodiments.

FIG. 6 is a flow diagram that describes a method of client/driver communication accordance with one or more embodiments. The method can be performed in connection with any suitable hardware, software, firmware, or combination thereof. In at least some embodiments, aspects of the method can be performed by client-side code, such as the code that is described above. These aspects are designated "Client-side code." Similarly, other aspects of the method can be performed by driver-side code, such as the code that is described above. These aspects are designated "Driver-side code."

Step 600 receives, within an application process, a call associated with a driver operation. In one or more embodiments, the call can be received by way of an interface that has been automatically generated based on an intermediate representation of a set of driver operations that has been authored in accordance with a standardized schema. Step 602 causes data associated with the call to be marshalled. Any suitable type of marshalling operation can be utilized. In the example provided above, data is marshalled using remote procedure call routines. Step 604 causes marshalled data to be communicated to a driver associated with the driver operation. This step can be accomplished in any suitable way, examples of which are provided above.

Step 606 receives marshalled data. In one or more embodiments, the marshalled data can be received by way of an interface that has been automatically generated, on the driver-side, based on the intermediate representation of the set of driver operations mentioned above. Step 608 causes the marshalled data to be un-marshalled. This step can be performed in any suitable way, examples of which are provided above. Step 610 calls an associated driver with the un-marshalled data. Step 612 performs an associated operation using the un-marshalled data. Step 614 causes return data to be marshalled and step 616 returns the marshalled data to the application.

Step 618 receives the marshalled data and step 620 causes the marshalled data to be un-marshalled and subsequently processed by the application.

As a simple example, consider the following. Assume that a vendor has a device that makes toast. The toaster device has one operation—making toast. Making toast has a single parameter—"doneness"—which is an integer from 1 (warm) to 10 (burnt). The driver writer writes a descriptor file that describes a new interface "Toaster" with one operation "MakingToast" with a single parameter "Doneness". The driver writer runs the code generation tool against the descriptor file and produces client and driver code. The driver writer builds the driver, including the driver code, that instructs the toaster how to operate. The driver writer then builds a client application that shows a user interface that allows the end-user to see and set what "doneness" they want. The client application includes client code, and when the user clicks "Toast", it calls "MakingToast" with specified "doneness". Client dispatch code marshals this operation into a packet and sends it to the driver. The driver invokes dispatch code which un-marshals the packet and passes the information to the "MakingToast" operation in the driver. The driver then instructs the device to make toast.

Conclusion

Various embodiments provide a mechanism by which a driver writer can describe the operation set of a particular driver using an intermediary representation, such as an XML. A generation tool can then process the intermediary representation and generate client code and device driver code to support these operations.

In one or more embodiments, driver operation and associated elements that support the driver operation can be described according to a customized schema that is specific to the operation of the particular device driver. The description, as represented by the customized schema, can be converted into a distinct set of code files that support communication from the client to the driver for a particular set of operations.

In one or more embodiments, distinct security requirements associated with individual operations of a driver's set of operations can be specified and applied, as opposed to having blanket security across all operations, thus alleviating the need to manually perform intricate bit manipulations in the driver.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more processors; and
one or more computer readable storage memories, coupled to the one or more processors, embodying computer readable instructions, executable by the one or more processors to implement a code generation tool configured to:
receive a device operation descriptor file that represents an intermediate representation of a set of driver operations for a driver, the descriptor file comprising security rights that are assignable to individual driver operations, on an operation-by-operation basis;
use the device operation descriptor file to automatically generate a file that describes interface contracts defined by the device operation descriptor file;

pass the file generated from the device operation descriptor file to a compiler;
receive an export file from the compiler; and
use the export file to generate client-side and device driver-side code to enable the communication between client-side and device driver-side entities, including the enforcement of the security rights for one or more driver operations using an access control list associated with the individual driver operation.

2. The system of claim 1, wherein the device operation descriptor file comprises an XML file that has been created in accordance with a standardized schema.

3. The system of claim 1, wherein the file generated from the device operation descriptor file comprises an IDL file.

4. The system of claim 1, wherein the compiler comprises a MIDL compiler.

5. The system of claim 1, wherein the client-side code is configured to cause client data to be marshalled and for requests to be sent to the driver.

6. The system of claim 1, wherein the driver-side code is configured to cause return data to be marshalled and for marshalled return data to be returned to an associated client.

7. The system of claim 1, wherein the schema enables specification of:
a single interface that comprises a set of operations that the driver implements, wherein individual operations can be specified in terms of a set of parameters and a list of attributes.

8. The system of claim 1, wherein the schema enables specification of:
a single interface that comprises a set of operations that the driver implements, wherein individual operations can be specified in terms of a set of parameters and a list of attributes.

9. One or more computer-readable storage memory devices comprising instructions which, when executed, implement a method comprising:
receiving, within an application process, a call associated with a driver operation, wherein the call is received by way of an interface that has been automatically generated based on an intermediate representation of a set of driver operations authored in accordance with a standardized schema, the schema enabling security rights to be assigned to individual driver operations, on an operation-by-operation basis;
causing data associated with the call to be marshalled to provide first marshalled data;
causing the first marshalled data to be communicated to a driver associated with the driver operation, the driver enforcing the security rights for one or more driver operations using an access control list associated with the individual driver operation;
receiving, from driver-side code, second marshalled data representing return data; and
causing the second marshalled data to be un-marshalled and processed by an application executing in the application process.

10. The one or more computer readable storage memory devices of claim 9, wherein the standardized schema comprises an XML schema.

11. The one or more computer readable storage memory devices of claim 9, wherein causing data to be first marshalled and causing the second marshalled data to be un-marshalled comprises using a remote procedure call (RPC) component within the application process.

12. The one or more computer readable storage memory devices of claim 9, wherein the standardized schema enables specification of:
a single interface that comprises a set of operations that a driver implements, wherein individual operations can be specified in terms of a set of parameters and a list of attributes.

13. The one or more computer readable storage memory devices of claim 9, wherein the standardized schema enables specification of:
a single interface that comprises a set of operations that a driver implements, wherein individual operations can be specified in terms of a set of parameters and a list of attributes.

14. The one or more computer readable storage memory devices of claim 9, wherein the standardized schema enables specification of:
a single interface that comprises a set of operations that a driver implements, wherein individual operations can be specified in terms of a set of parameters and a list of attributes; and
one or more files that contain or describe structures associated with parameters of an operation.

15. A computer implemented method comprising:
receiving first marshalled data associated with a driver operation call from client-side code executing in an application process, wherein the first marshalled data is received by way of an interface that has been automatically generated based on an intermediate representation of a set of driver operations authored in accordance with a standardized schema, the schema enabling security rights to be assigned to individual driver operations, on an operation-by-operation basis;
causing the first marshalled data to be un-marshalled;
calling an associated driver with un-marshalled data effective to cause performance of the driver operation, the driver enforcing the security rights for one or more driver operations using an access control list associated with the individual driver operation;
causing return data associated with the driver operation to be marshalled to provide second marshalled data; and
returning the second marshalled data to an application executing in the application process.

16. The computer-implemented method of claim 15, wherein causing the first marshalled data to be un-marshalled comprises using a remote procedure call (RPC) component.

17. The computer-implemented method of claim 15, wherein causing the first marshalled data to be un-marshalled comprises using a remote procedure call (RPC) component, wherein the RPC component comprises a user mode component.

18. The computer-implemented method of claim 15, wherein causing the first marshalled data to be un-marshalled comprises using a remote procedure call (RPC) component, wherein the RPC component comprises a kernel mode component.

19. The computer-implemented method of claim 15, wherein causing the first marshalled data to be un-marshalled comprises using a remote procedure call (RPC) component, wherein the RPC component comprises a kernel mode component.

20. The computer-implemented method of claim 15, wherein the standardized schema enables specification of:
a single interface that comprises a set of operations that a driver implements, wherein individual operations can be specified in terms of a set of parameters and a list of attributes.

* * * * *